(No Model.) 2 Sheets—Sheet 1.
F. SHICKLE.
APPARATUS FOR FORMING CORES AND MOLDS.
No. 289,037. Patented Nov. 27, 1883.
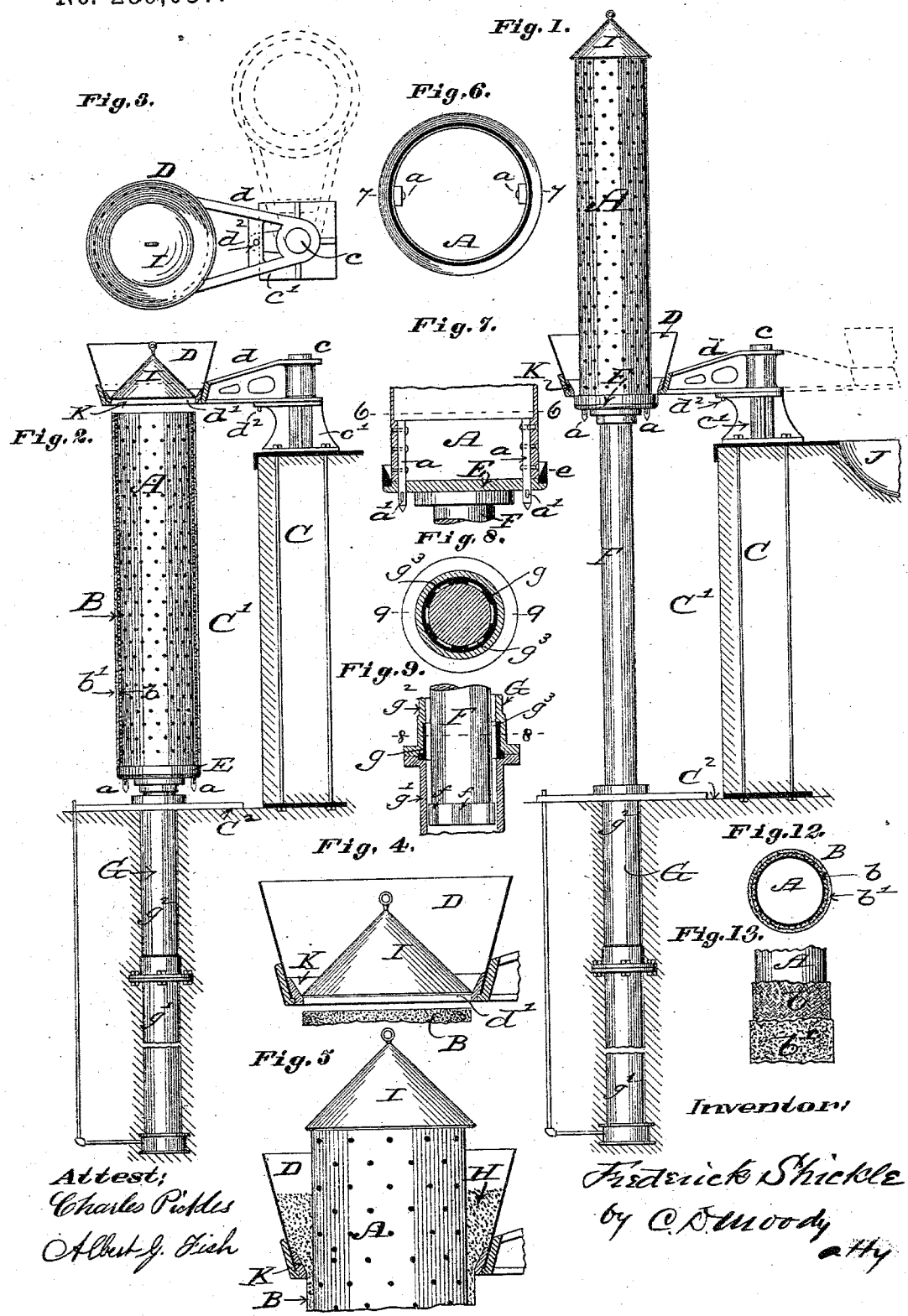

(No Model.) 2 Sheets—Sheet 2.

F. SHICKLE.
APPARATUS FOR FORMING CORES AND MOLDS.

No. 289,037. Patented Nov. 27, 1883.

Attest:
Charles Pickles
Albert J. Fish

Inventor:
Fredrick Shickle
by C. D. Moody
atty

UNITED STATES PATENT OFFICE.

FREDERICK SHICKLE, OF ST. LOUIS, MISSOURI.

APPARATUS FOR FORMING CORES AND MOLDS.

SPECIFICATION forming part of Letters Patent No. 289,037, dated November 27, 1883.

Application filed August 4, 1882. (No model.)

*To all whom it may concern:*

Be it known that I, FREDERICK SHICKLE, of St. Louis, Missouri, have made a new and useful Improvement in Apparatus for Forming Cores and Molds in Pipe-Making and Similar Castings, of which the following is a full, clear, and exact description, reference being had to the annexed drawings, making part of this specification, in which—

Figure 10:
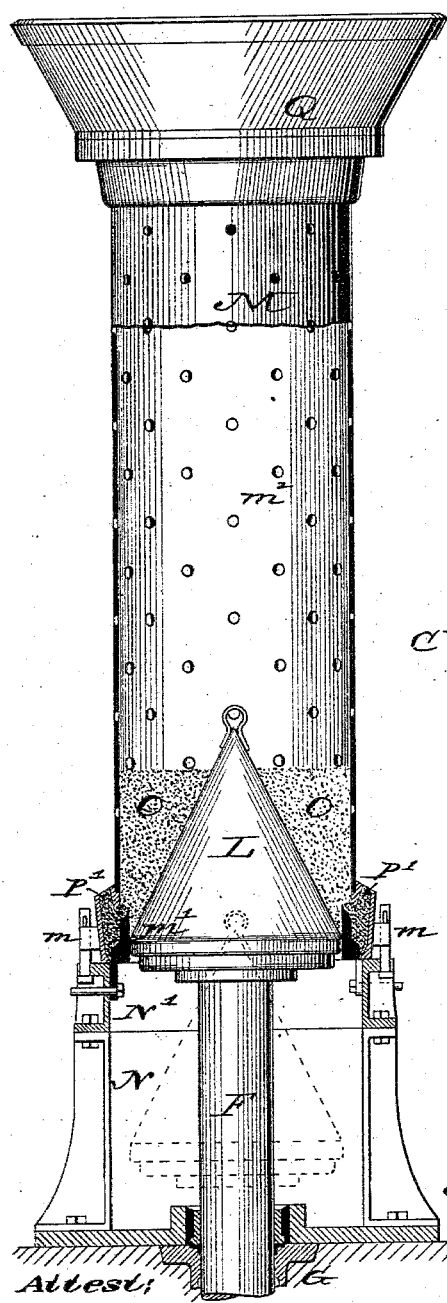
Figure 11:
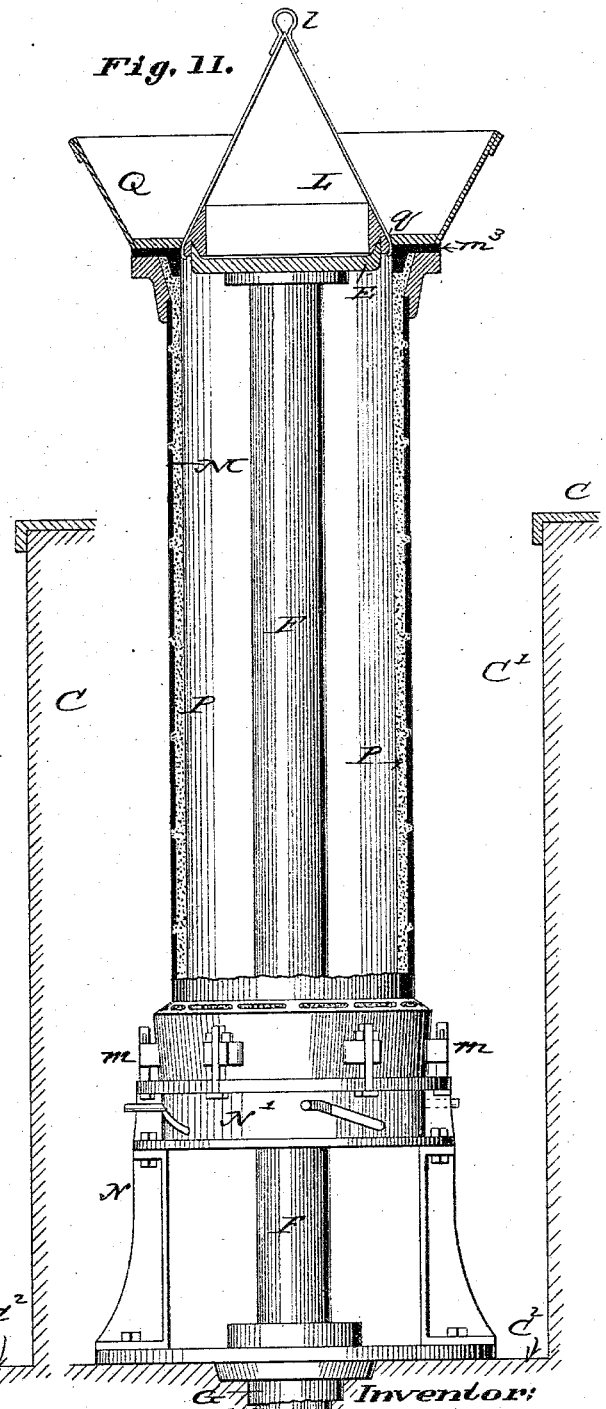

Figure 1 is an elevation, partly in section, showing the apparatus used in forming the cores, the core-bar and ram being elevated; Fig. 2, a similar view, the core-bar and ram being lowered; Fig. 3, a plan of the hopper used in forming the core; Fig. 4, a vertical section, upon an enlarged scale, of the hopper; Fig. 5, a vertical section of the hopper, showing the mode of applying the coating to the core-bar; Fig. 6, a horizontal section taken on the line 6 6 of Fig. 7; Fig. 7, a vertical section taken on the line 7 7 of Fig. 6; Fig. 8, a horizontal section taken on the line 8 8 of Fig. 9; Fig. 9, a vertical section taken on the line 9 9 of Fig. 8; Fig. 10, a sectional elevation, showing the apparatus used in forming the mold, the ram being lowered; Fig. 11, a vertical section, showing the parts of Fig. 10, the ram being elevated; and Figs. 12 and 13, details showing the construction of the cores.

The same letters denote the same parts.

The present invention is an improvement in that class of pipe-molding apparatus wherein the cores and molds are formed by depositing the clay or other material used in coating the core-bar and lining or making the mold endwise upon the core-bar or mold, beginning at one end of the core or mold and laying the material on until the other end of the core-bar or mold is reached, enabling the operation to be readily and easily performed. The forming of the core will be first described.

A, Figs. 1, 2, 5, 6, 7, represents a core-bar of the kind ordinarily used in pipe-making, and, when finished, having a clay coating, B, Figs. 2, 5. It is this coating that is by means of the present improvement to be formed upon the bore-bar.

C represents the wall of a pit, C', such as is used in pipe-making.

D represents a hopper supported from the wall C, being preferably arranged by means of the arm $d$ to swing horizontally upon a bearing, $o$, upon the wall, the movement of the hopper being indicated by the broken lines in Figs. 1, 3—that is, the hopper can be swung around so as to bring it either over the ground without the pit-wall or to project from the pit-wall inwardly over the pit. The core-bar is made to be moved upward and downward in the pit C' through the hopper D when the hopper is projecting inwardly from the pit-wall. To this end the core-bar, at its lower end, is held in or supported upon a socket, E, which in turn is supported upon a ram, F. The socket is detachable from the ram, to enable sockets of different sizes to be used. The ram F is moved upward and downward by any suitable means, preferably by hydraulic power, the ram working in a suitable water-cylinder, G, and in the ordinary way, and in connection with the usual appliances (which are not here fully shown, as their nature is well understood) of hydraulic rams. The socket in diameter fits the opening $d'$ in the hopper D. The socket also coincides in diameter with the finished core—that is, when the clay coating B has been applied to the core-bar.

The operation is as follows: The core-bar A is first secured to the socket E in an upright position. For this purpose the most convenient means I have ascertained to be that shown in Figs. 1, 2, 6, 7, the core-bar being furnished with dowels $a$ $a$, which, when the core-bar is in place, pass downward through the socket, and underneath the socket are perforated, to receive keys $a'$ $a'$. The hopper being swung around over the pit, so as to bring the opening $d'$ in the hopper exactly over the socket E, and the hopper being secured in that position, say, by means of the pin $d^2$, passing through the arm $d$ into a bracket, $e'$, upon the pit-wall, the ram is elevated to bring the socket and core-bar into the position shown in Fig. 1, the socket coming up to the opening $d'$ in the hopper and the core-bar projecting upward through the opening $d'$. The hopper is then filled with the material H, Fig. 5, to be applied to the core-bar and form the desired coating thereon. In this initial position the socket E closes the opening $d'$ of the hopper. The ram, socket, and core-bar are then lowered. As the socket drops below the hopper, the coating B begins to form upon the core-bar, as shown in Fig. 5. The material H is suitably prepared to adhere to the core-bar. After the socket has dropped below the hopper, an annular space at the bottom of the hopper surrounds the core-bar. The material H falls into this annular space and against the core-bar. The result is the forming of the coating upon the core-bar, and of a thickness sufficient to complete the core to the desired diameter, and by continuing to lower the core-bar the coating B is made to extend the length of the core-bar, as seen in Fig. 2, and the core is finished, so far as the application of the coating is concerned. If desired, the core-bar can be passed upward and downward through the hopper more than once, and either to perfect the original coating or to apply the coating in installments or layers. As the upper end of the core-bar drops below the hopper, a cap, I, which has been resting upon the core-bar, lodges in the bottom of the hopper (the cap in diameter being larger than the opening $d'$ in the hopper) and closes the opening $d'$, as seen in Figs. 2, 4. This prevents the remnant of the material H in the hopper from dropping through the hopper. The hopper can then be swung upon the bearing $c$ around, as indicated in Fig. 1, over a basin, J, and then by raising the cap I the material H can fall into the basin, and there be combined with a fresh lot of coating material, the basin being a convenient receptacle in which the coating material can be prepared, and thence, as needed, transferred to the hopper. When the core-bar is elevated, the upper end of the core-bar, encountering the cap I, lifts the latter from the hopper and supports it until the core-bar is again lowered. The hopper is at the bottom preferably made with a removable ring, K. This enables the diameter of the opening $d'$ to be adjusted to the size of the intended core, the rings K, while externally fitting the hopper, being internally of different diameters, to suit the desired size of core.

If desired, that part $e$ of the socket E with which the coating B comes immediately in contact may be made rotatable upon the main part of the socket, to enable the connection between the coating and the socket to be readily broken, for occasionally the clay may adhere to the socket. By turning the part $e$ around, the clay is detached. The socket E is also made detachable from the ram, so that the socket may be changed to suit the size of core being made. The cylinder G extends downward below the bottom $C^2$ of the pit. To prevent the ram from being lifted too high in the cylinder, the latter is furnished with a stop, $g$, and the ram is furnished with a projection to encounter the stop $g$. The best mode of carrying out this feature of the construction is shown in Figs. 8, 9—that is, the cylinder G is made in two parts, $g'$ and $g^2$, and the stop $g$ is inserted in the cylinder at the junction of the parts $g' g^2$, resting upon the lower part, $g'$, and at its upper edge encountering a shoulder in the part $g^2$, as seen in Fig. 9. The ring $g$ is notched at $g^3$, and the ram F is provided with projections $f f$, which fit the notches $g^3 g^3$. The ram is dropped into the cylinder, the projections $f$ passing down in the notches $g^3$, and after passing the ring $g$ the ram is turned around, so as to bring the projections out of line with the notches. In this position the ring $g$ acts as a stop. The ram, however, can at any time be removed (as for repair) from the cylinder by turning the ram around until the notches are in line with the projections, whereupon the ram can be raised.

The lining of the mold will now be described. The core is removed from the ram and a cone-shaped head, L, Figs. 10, 11, attached to the ram. The mold M is then placed in position over the head L. The mold is upheld upon a stand, N, to provide suitable access to the lower end of the mold. The stand in diameter is large enough not to interfere with that portion of the apparatus used in operating the core-bar. The mold, by means of suitable detachable fastenings, $m m$, is secured to the stand, and so as to be concentric with the head L and the ram F. As shown in the drawings, the pipe is cast the bell end downward; and $m'$ represents the pattern used in forming the bell part of the mold. This pattern $m'$ can (and as more fully explained in Letters Patent heretofore granted me for an improvement in pipe-molding apparatus) be vertically adjusted in the upper part, N', of the stand N. The pattern $m'$ is shown in Figs. 10, 12 in position for forming the mold. The head L in diameter fits the part $m'$, and is equal to the internal diameter of the finished mold, and is preferably of the conical form shown.

The operation is as follows: The parts are brought into the position shown in Fig. 10. The material O, used in lining the mold and in proper condition therefor, is then poured into the mold, and is upheld therein by means of the head L, as seen in Fig. 10. The head L, by means of the ram F, is then moved upward in the mold M, and as the head ascends the material O falls into the annular space around the head and between the head and the mold, and is pressed against the inner surface, $m^2$, of the flask and caused to adhere thereto, and by continuing to elevate the head L to the upper end of the flask the lining P is formed therein, as shown in Fig. 11. The surplus material O remaining after forming the lining P and lifted by the head above the flask is received in the pan Q at the top of the flask. The head L ascends through an opening in the bottom $q$ of the pan. The head at its largest diameter is slightly larger than the opening in the pan, and by continuing to elevate the head the pan containing the surplus material O is also lifted, the head serving to close the opening in the pan. Then by connecting a suitable lift—say a crane—to the eye $l$ of the head the head carrying the pan can be lifted from off the socket and borne away from the flask to a suitable place for dumping the material O. A suitable ring, $m^3$, is employed at the top of the flask for forming the head part of the mold. The lower part, P', of the lining may, before elevating the head L, as described, be packed in the usual way by rammers. The mold can be lined by means of the present improvement, the bell end upward, in which case the parts $m'$ $m^3$ are by any suitable means therefor held in place in the mold.

In Figs. 10, 11 the material O for forming the lining P is supposed to be of a semi-fluid nature—such as clay moistened with water—and as the head L rises in the mold the material readily finds its way into the annular space between the head and the shell of the mold; but when the mold-lining or the core-coating is to be formed of sand an apparatus essentially different from that herein described must be employed. The apparatus now referred to is described in a pending application for Letters Patent.

As is understood, in making cores for castings—such as pipes—it is essential to construct the core so that after the pipe is cast the core-bar can be separated from its coating. Otherwise the core cannot be withdrawn from the pipe. To this end it has been customary in making the core to first wrap the core-bar with a band of hay, and then finish the core with an outer coating of clay. Then as the casting is made the heat incident thereto effects the combustion of the hay, thereby operating to separate the bond between the core-bar and its outer coating. The core-bar is then withdrawn from the pipe, after which the clay core-bar coating is removed from the pipe. In the present case the core-bar can be separated from its outer coating. In place, however, of a hay band for the inner combustible coating, I employ a pulp which is equally combustible with the hay band referred to, but sufficiently plastic in its original condition to enable it to be applied to the core-bar in accordance with the present method—that is, the pulp, made, preferably, of such material as horse-manure, cut straw, &c., and in a semi-fluid state, is placed in the hopper D, and thence transferred to the core-bar A, as above described, forming the sub-coating $b$, Figs. 2, 15, 16. The outer coating, $b'$, is then similarly applied, forming the complete coating B.

I claim—

1. The combination of the core-bar A, the hopper D, the arm $d$, the pit-wall C, and the pit C', substantially as described.

2. The combination of the pit-wall C, the arm $d$, the hopper D, the core-bar A, and means for raising and lowering the core-bar through the hopper.

3. The combination of the hopper D, the core-bar A, and the ram F, said hopper being supported from the pit-wall C, substantially as described.

4. The combination of the hopper D, supported from the pit-wall C, the core-bar A, the ram F, and a removable socket, said socket being supported upon the ram, and said core-bar being supported upon the socket.

5. The combination of the core-bar A and the socket C, said socket having the removable part $e$, for the purpose described.

6. The combination of the pit-wall C, the hopper D, the arm $d$, the pin $d^2$, and the bracket $c'$, substantially as described, and for the purpose set forth.

7. The combination of the pit-wall C, the arm $d$, hopper D, the core-bar A, and the ring K, as and for the purpose described.

8. The combination of the core-bar A, the ram F, the hopper D, and the cap I, substantially as described.

9. The combination of the pan Q, ram F, the head L, and the mold M, for the purpose described.

10. The combination of the mold M, the stand N, pan Q, the ram F, and the head L, substantially as described.

11. The combination of the mold M, the head L, and the pan Q, substantially as described.

12. The combination of the mold M, the head L, and the cylinder L', for the purpose described.

13. The combination of the mold M, the head L, the cylinder L', and the ram F, substantially as described.

14. The combination of the mold M, the head L, the cylinder L', and the ring $L^2$, substantially as described.

FREDERICK SHICKLE.

Witnesses:
C. D. MOODY,
ALBERT G. FISH.